United States Patent
Schneeberger

[15] 3,678,759
[45] July 25, 1972

[54] ROTATING CUP PARTICLE SIZING SAMPLING APPARATUS

[72] Inventor: Richard F. Schneeberger, Snyder, N.Y.
[73] Assignee: Cornell Aeronautical Laboratory, Inc., Buffalo, N.Y.
[22] Filed: Jan. 22, 1971
[21] Appl. No.: 108,817

[52] U.S. Cl..............................................73/432 PS, 73/28
[51] Int. Cl.....................................G01n 1/22, G01n 15/02
[58] Field of Search.....................73/432 PS, 28, 23, 170 R

[56] References Cited

FOREIGN PATENTS OR APPLICATIONS 134,890  2/1960  U.S.S.R. ....................................73/28
1,013,098  8/1957  Germany...................................73/23

OTHER PUBLICATIONS

Sampling the Upper Atmosphere for Particulate Matter. In Atl. Research Corp. Pub. Apr. 1960 p. 1–4, 12–28.

Primary Examiner—Louis R. Prince
Assistant Examiner—Joseph W. Roskos
Attorney—Allen J. Jaffe

[57] ABSTRACT

A pair of rotating arms having a plurality of aerosol particle collection cups of various entrance areas fixed to the leading edges of the arms at various radially spaced points, the cups can be interchanged to vary the speed and collection efficiencies whereby particle size distributions can be calculated according to impaction theories.

15 Claims, 4 Drawing Figures

Patented July 25, 1972

3,678,759

2 Sheets-Sheet 1

RICHARD F. SCHNEEBERGER
INVENTOR

BY

ATTORNEY

RICHARD F. SCHNEEBERGER
INVENTOR

BY
ATTORNEY

3,678,759

ROTATING CUP PARTICLE SIZING SAMPLING APPARATUS

BACKGROUND OF THE INVENTION

The present invention relates particle sizing apparatus, and, more particularly, to apparatus for aiding in the determination of aerosol particle sizes.

The task of measuring the size distribution of aerosols, either natural or under controlled conditions, is rendered difficult by a number of factors, among which are:

1. In aspirated devices, errors are introduced by anisokinetic sampling conditions, in which the wind speed is not the same as the sampler intake velocity; such errors or bias being a function of particle size.

2. In cascade impactor type devices (in which particles of decreasing size are removed at sequential sampling surfaces by inertial force) in addition to the input problem noted above; particle fracture and evaporation are also encountered. Also, particles of a size greater than 20 micrometers are not classified.

3. Other types of samplers and sizing devices, such as electrostatic, thermal, fallout slides and the like have similar input and/or size limitation problems.

SUMMARY OF THE INVENTION

The foregoing difficulties, as well as others, of the prior devices are overcome according to the teachings of the present inVention which provides an aerosol particle sizing apparatus having a capability for determining the characteristics of a particle size distribution of an aerosol, the particles of which range is size from about 10 to 150 microns.

Basically the apparatus of the present invention comprises rotating arms having a plurality of various sized impaction type collectors supported on leading surfaces of the arms at various radial distances from the axis of rotation thereof.

According to one form of the invention the arms comprise airfoils whereas according to a second form the arms comprise cylindrical rod-shaped members.

The efficiency of impaction of aerosol particles on impaction surfaces, such as a set of impaction cups, is a function of the cup diameter or entrance area, particle size, cup-air stream velocity difference and particle density. Based on the foregoing, a set of $n$ cups of the same diameter transported through a homogeneous aerosol cloud at $n$ different speeds will collect $n$ different weights of aerosol particles. Alternatively, $n$ cups of $n$ different diameters transponded through the cloud with the same velocity will also collect $n$ different weights of aerosol particles. By employing velocity and cup size over various ranges the data necessary to describe the particle size distribution is developed. The present invention thus provides a simple and efficient apparatus which functions to enable such data to be developed.

BRIEF DESCRIPTION OF THE DRAWINGS

For a fuller understanding of the present invention reference should now be had to the following detailed description of the same taken in conjunction with the accompanying drawings wherein;

FIG. 1 is an elevational schematic representation of one form of the apparatus according to the present invention, FIG. 2 is a view taken line 2—2 of FIG. 1, FIG. 3 is an elevational view of a second embodiment of the present invention, FIG. 4 is a view taken along line 3—3 of FIG. 2.

DESCRIPTION OF THE PREFERRED EMBODIMENTS

Referring now to the drawings and, more particularly, to FIGS. 1 and 2 wherein one embodiment of the sampling apparatus according to the present invention is generally depicted by the numeral 10. As illustrated, the apparatus comprises a central hub 12 to which is fixedly attached by any suitable means a drive shaft 14 which is adapted to be rotated in the direction of arrow A by any suitable motor means indicated at 16. Fixedly attached to side faces of hub 12 to rotate therewith are a pair of arms 18 and 20 extending radially outwardly therefrom. Arms 18 and 20 are of generally airfoil shape in section and have leading edges 22, 24 and trailing edges 26, 28.

A plurality of aerosol particle collection means in the form of cups 30, 32, 34, 36 and 38 are affixed to the leading edges 22, 24 of each arm 18, 20 at various radially spaced points thereof between the hub and the outer tips. As illustrated the cups are threaded into suitable openings in the leading edges; however, any other suitable form of attachment would suffice. Although five cups are shown in each arm, this is for illustrative purposes only and should not therefore be limitative of the present invention.

As illustrated the outer diameter of each of the cups 30, 32, 34, 36 and 38 are identical so that complete interchangeability is insured. However, the internal diameter of each of the cups and therefore the entrance area of each of the cups is quite distinct. In the position illustrated, by way of example only, the entrance area of the cups vary from of maximum at 30 adjacent the hub to a minimum at 38 adjacent the tip or furthest removed radially from the hub.

As illustrated at 40 the entrance to each of the cups is tapered to minimize interference with the airstream associated with the particles.

In operation, the apparatus is placed in an environment containing the aerosol to be tested and driven by motor 16 at a known rate. As the arms 18 and 20 rotate the cups 30–38 collect particles in the aerosol by impaction.

According to well known impaction theory the sampling efficiency of each of the cups is a function of the impaction parameter, K, which is, in turn, a function of cup diameter, cup velocity and particle size.

The velocity of a cup of given diameter or entrance area can be changed by changing its radial position on the arms 18 and 20. In effect, then, a range of impaction parameters and therefore sampling efficiencies can be obtained by employing several cups of different diameters and speeds. Then by measuring the amount of aerosol material collected in each cup and comparing the collections between cups, the mass median diameter and particle size distribution may be calculated.

For a further discussion of impaction theory and particle size determination reference may be had to the following publications:

1. "The Mechanics of Aerosols", N. A. Fuks, The MacMillan Co. 1964; and
2. "Inertial Impaction on Single Elements", M. N. Golovin and A. A. Putnam, I & EC Fundamentals, Volume 1, No. 4 November, 1962.

The airfoil shaped arms of FIGS. 1 and 2, although reducing drag, did produce lift which caused some distortion of the aerosol stream resulting in some alteration in particulate concentration, which, in turn, made callibration difficult.

To overcome the above mentioned difficulty, the embodiment illustrated in FIGS. 3 and 4 was developed, wherein like numerals and primes refer to like numbered parts of the FIGS. 1 and 2 embodiment.

Essentially, the embodiment of FIGS. 3 and 4 differs from the previously described embodiment in the design of the rotating arms.

Thus, the airfoil shaped arms 18 and 20 have been replaced with cylindrically shaped arms 18' and 20', which are fixedly attached to hub 12'. Arms 18' and 20' extend radially outward from hub 12' at opposite inclinations upto a bend 50, and then become parallel to one another. As will be apparent such arrangement permits the particles to enter the collection cups in a common plane.

The cups 30', 32', 34', 36' and 38' are affixed to a plurality of pins 52 which project perpendicularly from arms 18' and 20' at radially spaced points therealong. Note, that some of the points may be coextensive; in which case, the pins project in opposite directions.

The rearward face of each cup contains a substantially rectangular section 54 having a through opening 56 therein. Shafts 52 are adapted to pass through openings 56 and a plurality of set screws 58 or the like function to secure the cups in their respective positions on arms 18' and 20', with the openings of the cups facing in the direction of motion of the arms.

Figure 1:
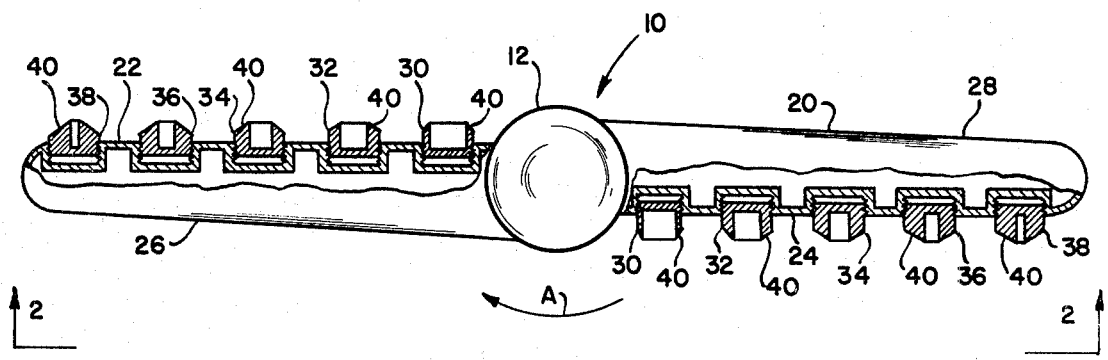
Figure 2:
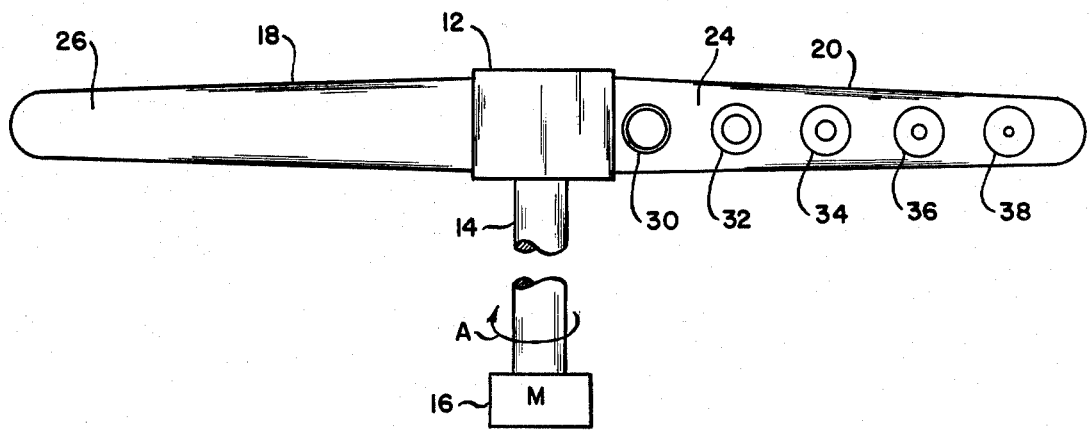
Figure 3:
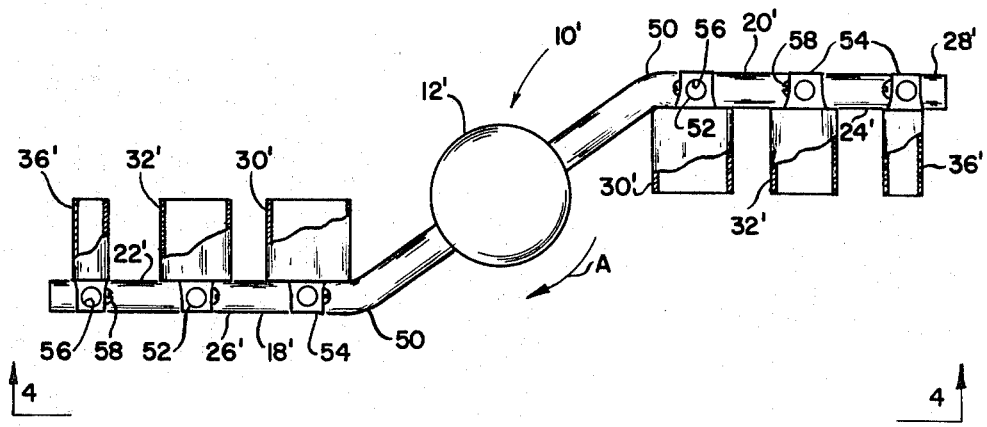
Figure 4:
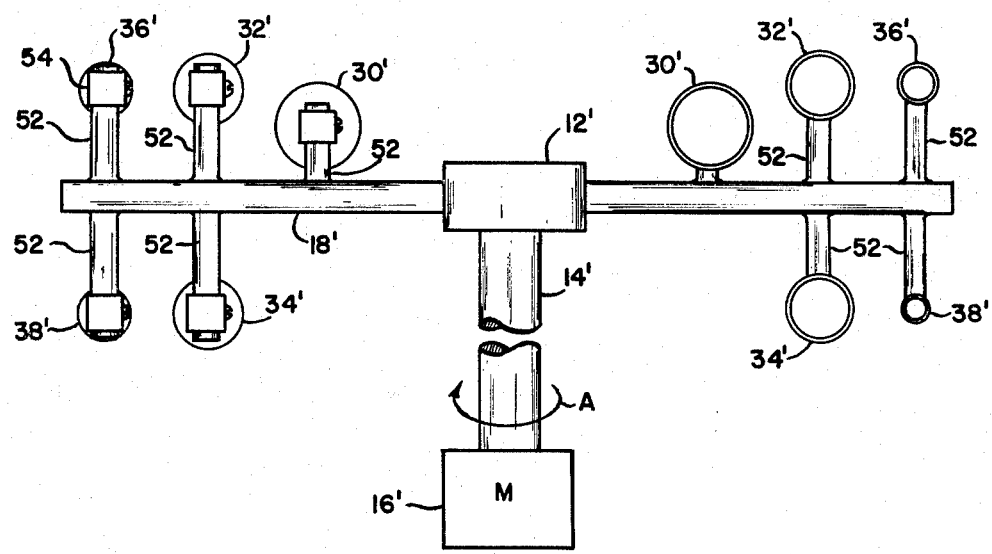

The operation of the FIGS. 3 and 4 embodiment is similar to the previously described embodiment and therefore no further discussion is necessary, except to note that since there is no lift associated with the cylindrically shaped arms 18' and 20' the calibration difficulties of the previous embodiment are no longer present.

Preferred embodiments of the present invention have been illustrated and described; changes will occur to those skilled in the art. It is therefore intended that the present invention is to be limited only by the scope of the appended claims.

I claim:

1. Apparatus of the character described, comprising;
 a. at least one arm rotatable about an axis
 b. a plurality of aerosol collection means comprising a plurality of cups located at various radial distances away from the rotational axis of said arm,
 c. means mounting said cups on said arm for rotation therewith, and
 d. said cups are of varying entrance areas decreasing from a maximum nearest said axis to a minimum furthest therefrom.

2. The apparatus according to claim 1, wherein;
 e. said means for mounting are similar for each of said cups whereby the position of each of said cups can be interchanged.

3. The apparatus according to claim 2, wherein;
 f. said arm has a leading edge and a trailing edge, and
 g. said cups face in the direction of said leading edge.

4. The apparatus according to claim 3, further comprising;
 h. motor means for rotating said arm.

5. The apparatus according to claim 3, wherein;
 h. said arm is of airfoil shape in section.

6. The apparatus according to claim 3, wherein;
 h. said arm is of cylindrical shape in section.

7. The apparatus according to claim 6, wherein;
 i. said mounting means comprises pins and bores on one of each of said cups and arm.

8. Apparatus of the character described comprising;
 a. a pair of arms rotatable about an axis,
 b. a plurality of aerosol collection means comprising cups,
 c. means for mounting said cups to each of said arms for rotation therewith,
 d. said cups are located at various radial distances away from the rotational axis of said arms, and
 e. said cups are of varying entrance areas decreasing from a maximum nearest said axis to a minimum furthest therefrom.

9. The apparatus according to claim 8, wherein;
 f. said means for mounting are similar for each of said cups whereby the position of each of said cups can be interchanged.

10. The apparatus according to claim 9, wherein;
 g. each of said arms have a leading edge and a trailing edge, and
 h. said cups face in the direction of said leading edge.

11. The apparatus according to claim 10, further comprising;
 i. motor means for rotating said arms.

12. The apparatus according to claim 10, wherein;
 i. said arms are of airfoil shape in section.

13. The apparatus according to claim 12, wherein;
 i. said arms are of cylindrical shape in section.

14. The apparatus according to claim 13, wherein;
 j. said mounting means comprises pins and bores on one of each of said cups and arms.

15. The apparatus according to claim 10, wherein;
 i. each of said arms are inclined such that the entrance to each of said cups lies in a common plane.

* * * * *